(12) United States Patent
Winther-Jensen

(10) Patent No.: US 7,238,395 B2
(45) Date of Patent: Jul. 3, 2007

(54) METHOD OF COATING THE SURFACE OF AN INORGANIC SUBSTRATES WITH AN ORGANIC MATERIAL AND THE PRODUCT OBTAINED

(75) Inventor: Bjørn Winther-Jensen, Copenhagen Ø (DK)

(73) Assignee: NKT Research A/S, Lyngby (DK)

( * ) Notice: Subject to any disclaimer, the term of this patent is extended or adjusted under 35 U.S.C. 154(b) by 554 days.

(21) Appl. No.: 10/275,550

(22) PCT Filed: May 10, 2001

(86) PCT No.: PCT/DK01/00327

§ 371 (c)(1),
(2), (4) Date: Apr. 1, 2003

(87) PCT Pub. No.: WO01/85635

PCT Pub. Date: Nov. 15, 2001

(65) Prior Publication Data

US 2004/0265505 A1    Dec. 30, 2004

(30) Foreign Application Priority Data

May 10, 2000  (DK) ............................... 2000 00776

(51) Int. Cl.
*B05D 3/04* (2006.01)
*C08F 2/46* (2006.01)
(52) U.S. Cl. ...................... 427/488; 427/535; 427/569; 427/299
(58) Field of Classification Search ................ 427/488, 427/535, 569, 299
See application file for complete search history.

(56) References Cited

U.S. PATENT DOCUMENTS

| | | |
|---|---|---|
| 4,217,038 A | 8/1980 | Letter et al. |
| 4,632,844 A | 12/1986 | Yanagihara et al. |
| 5,061,567 A | 10/1991 | Brochot et al. |
| 5,284,543 A * | 2/1994 | Kusano et al. ............ 156/272.6 |
| 5,935,455 A | 8/1999 | Glejbøl |
| 6,126,776 A | 10/2000 | Glejbøl et al. |
| 6,628,084 B1 | 9/2003 | Winther-Jensen et al. |

FOREIGN PATENT DOCUMENTS

| | | |
|---|---|---|
| DE | 28 41 128 | 12/1979 |
| DE | 274 85 68 | 5/1999 |
| EP | 0 346 055 A2 | 12/1989 |
| EP | 0 593 988 A1 | 4/1994 |
| JP | 01-165603 A * | 6/1989 |
| WO | WO00/20656 | 4/2000 |
| WO | WO00/44207 | 7/2000 |

OTHER PUBLICATIONS

JPO and Derwent abstracts of JP 01-165603, published Jun. 29, 1989.*
English language abstract of EP 0593988, published Apr. 27, 1994.
English language abstract of DE 2841128, published Dec. 6, 1979.
English language abstract of DE274568, published May 3, 1999.
Stanley Electric Co., Ltd., "Water Repellency Treatment of Base Material", Derwent Publications Ltd. Abstract of JP 62 191447,(Aug. 21, 1987).
BJ Kinzig, et al., Plasma-Polymerized Thin Coatings From Methyl-Methacrylate, Styrene and Tetrafluoroethylene, Surface Technology, vol. 14, pp. 3-16, (Jan. 1981).

* cited by examiner

*Primary Examiner*—Kirsten Jolley
(74) *Attorney, Agent, or Firm*—Finnegan, Henderson, Farabow, Garrett & Dunner, L.L.P.

(57) ABSTRACT

The invention relates to method of coating the surface of an inorganic substrate of glass, silicon dioxide, ceramics or carbon, which method comprises a step of cleaning the surface of the substrate by subjecting the surface to a reducing gas plasma, a step of activating the surface by generating radicals on the surface of the substrate by subjecting the surface to a reducing gas plasma and forming a first layer on the substrate surface using a plasma enhanced polymerization process employing one or more monomers comprising monomers with a sufficient low molecular weight for them to be in their gaseous state in the gas plasma, selected from the group consisting of $C_1$-$C_{16}$ alkanes, $C_2$-$C_{16}$ alkanes, $C_2$-$C_{16}$ alkynes, $C_2$-$C_{16}$ alkynes, styrene, aromatic monomers of styrene compounds, monomers of vinyl- and acrylate-compounds.

22 Claims, No Drawings

METHOD OF COATING THE SURFACE OF AN INORGANIC SUBSTRATES WITH AN ORGANIC MATERIAL AND THE PRODUCT OBTAINED

This application is a national stage filing of International Application PCT/DK01/00327, filed May 10, 2001. This application also claims the benefit of priority to Danish Patent Application No. PA 2000 00776, filed on May 10, 2000.

The present invention relates to a method for coating the surface of an inorganic substrate of glass or carbon with an organic material and the product obtained.

Coating of glass or carbon substrates with organic material is a very difficult process. To obtain sufficient binding strength between the coating material and the substrate material it is necessary to clean the surface of the substrate before coating. This cleaning is usually a chemical treatment, e.g. with organic solvents, to remove impurities. Even after the cleaning process the bonding between the organic molecules of the coating and the inorganic surface of the substrate has difficulties in resisting especially strong basic and strong ionic (salt) environments. The problem is well known from adhering of polymers to glass, where the polymer-coatings have a tendency to de-bind from the glass substrate and loose their ability to fulfil their purpose.

Several attempts have been made to avoid the above-mentioned problems and one solution is the use of plasma technology.

U.S. Pat. No. 5,061,567 discloses a coated glass substrate and the making of the same. A glass substrate is coated with an organomineral film in a plasma process. The purpose of the coating is primarily to improve the optical properties of the glass and the coated glass substrate does not have any properties to resist the influence of environments with e.g. high pH values.

Because of the difficulties in providing coatings on substrates of glass or carbon which do not have a tendency to de-bind from the substrate, there is a need for a method for coating surfaces of glass or carbon which will result in strong and durable bonding between the coating and the surface of the glass or carbon, even when exposed to very harsh environments e.g. with high pH values.

It has now surprisingly appeared that the above-mentioned needs can be met by the present invention. The invention provides a method by which a surface of an inorganic substrate, such as glass or carbon, can be coated with organic material, and where the bonding between the substrate and the coating is extremely strong and is able to resist harsh chemical environments e.g. with high pH values.

The invention also provides a method which is more environment-friendly than the known methods, as no organic solvents are used in the method. Furthermore, the method according to the invention is relatively cheap and can be performed as a continuous process in one reaction chamber.

Furthermore, the invention provides a coated inorganic substrate with a very wear-resistant, strong and long lasting organic coating.

The method according to the invention and the coated substrate obtained by the method are defined in the claims.

The method according to the invention provides substrates coated with organic material that are very suitable for use in aggressive environments with e.g. high pH values.

The coating is very strong and has only little tendency to de-bind from the substrate.

Furthermore, the method provides substrates coated with an organic material which has appeared to be very suitable for use in biochemical processes. Further, the coated substrate provides good basis for vulcanising.

The method of coating the surface of an inorganic substrate of glass, ceramics or carbon according to the invention comprises the steps of
i) cleaning the surface of the substrate by subjecting the surface to a reducing gas plasma,
ii) activating the surface by generating radicals on the surface of the substrate by subjecting the surface to a reducing gas plasma and forming a first layer on the substrate surface using a plasma enhanced polymerization process employing one or more monomers comprising monomers with a sufficient low molecular weight for them to be in their gaseous state in the gas plasma, selected from the group consisting of $C_1$-$C_{16}$ alkanes, $C_2$-$C_{16}$ alkenes, $C_2$-$C_{16}$ alkynes, $C_2$-$C_{16}$ alkynes, styrene, aromatic monomers of styrene compounds, monomers of vinyl- and acrylate-compounds.

In a preferred embodiment of the method according to the invention the monomers are selected from the group consisting of acetylene, ethane, ethylene, hexane, hexene, 1-hexene,3-methyl-1-hexene, 1,4-hexadiene, hexyne, 1-hexyne, methylacrylate, styrene and vinylpyrolidone.

In order to secure that the monomers are able to be in their gaseous state in the plasma it is preferred that the monomers have a molecular weight up to 350.

In the cleaning step it is important that the reducing gas is substantially free of oxygen and preferably the reducing gas should be able to remove the major part or more preferably substantially all of the oxygen present at the surface of the substrate.

In a preferred embodiment or the method according to the invention the reducing gas is $H_2$, $NH_3$, $B_2H_4$ or $F_2$ or a mixture of $H_2$, $NH_3$, $B_2H_4$, or $F_2$ and a inert gas, and preferably the mixture is a mixture of $H_2$ and argon.

In a preferred embodiment the substrate is coated with two layers of organic material. By use of this method including two layers of organic material a substrate having particular good properties for immobilizing biomolecules, vulcanising and/or adhering onto may be obtained. This embodiment of the method according to invention may e.g. be carried out by subjecting the coated substrate to a plasma enhanced polymerisation of monomers selected from the group consisting of vinylpyrolidone, acrylonitrile, glycidyl-matacrylate, methacrylacid-anhydride, methyl-benzalde-hyde and other vinyl or acryl containing monomers.

To avoid any contact with the oxygen of the atmosphere and to make the process as less complicated as possible a preferred embodiment of the method according to invention is that the method is executed subsequently in one chamber and preferably the method is executed as a continuous process.

As a precaution to prevent contact between oxygen and the substrate to be treated it is preferred that the atmosphere in said chamber at any step in the method is inert and/or reducing.

To optimize the conditions for the method according to invention it is preferred that the pressure is 0.01 to 1.0 mbar while the method is carried out, more preferably 0.04 to 0.4 mbar.

It is further preferred that the substrate is exposed to plasma with reducing gas from 1 to 3600 seconds, more preferably from 10 to 300 seconds and preferably the substrate is exposed to plasma-polymerisation from 1 to 6000 seconds, more preferably from 10 to 120 seconds.

In preferred embodiments of the method according to the invention the step i) comprises the generation of radicals by use of gas plasma generated by excitation of the gas in an alternating current (AC), a direct current (DC), low frequency (LF), audio frequency (AF), radio frequency (RF) or microwave generated electric field. Of course, any other suitable source for generating plasma may be used according with the invention.

In a first preferred embodiment of the method according to the invention, the inorganic substrate is glass or glass fibers.

In a second preferred embodiment of the method according to the invention, the inorganic substrate is silicon dioxide.

In a third preferred embodiment of the method according to the invention, the inorganic substrate is ceramic or ceramic fibers.

In a fourth preferred embodiment of the method according to the invention, the inorganic substrate is a carbon or carbon fibers.

The invention also comprises a coated inorganic substrate obtained by the method described above.

The invention may be carried out in any known type of equipment for carrying out the process of generating of plasma for coating purposes e.g. a 3-phase plasma chamber is very suitable.

The invention shall now be explained in further details with reference to the examples. The examples are only meant to illustrate specific embodiments of the invention and should not in any way be considered to be a limitation of the scope of the invention, as the skilled person would be able to carry out the invention in may other ways.

EXAMPLE 1

A glass slide having a dimension of 2.5×7 cm was placed in a 12 liter 3-phase plasma chamber. The pressure in the chamber was lowered to 0.08 mbar and a mixture of argon (10 sccm) and hydrogen (5 sccm) was led to the chamber.

A plasma of 10 W/liter was started. After 60 seconds the argon supply was stopped and the hydrogen flow was increased to 15 sccm. After another 60 seconds styrene was led to the chamber with 10 sccm, immediately after the flow of hydrogen was stopped.

When 20 seconds had passed with flow of styrene, the effect was lowered to 2 W/liter. After 60 seconds with flow styrene, a flow of methacrylacid-anhydride was led to the chamber, and hereafter the styrene flow was stopped.

The surface of the glass slide was used for binding DNA-oligomers, with a primary amine in the 3'-end. During the use of the bonded DNA, the surface of the glass slide was exposed to environments having a pH value up to 11.

EXAMPLE 2

Chopped glass fibres were placed in an 80 liters 3-phase plasma chamber. The chamber was designed, so the fibres moved from one end of the plasma to the other end and in such a way that the pumping was in the middle of the chamber. A flow of hydrogen was led to the end from which end the fibres were moving, and monemer was led to the other end.

During this process the pressure was 0.1 mbar, the flow of hydrogen was 30 sccm and the flow of monomer acethylene was 30 sccm. The plasma had an effect of 8 W/liter.

The starting velocity of the fibres was set so that the fibres were in the hydrogen area in 90 seconds and in the acethylene area for 90 seconds.

The fibres were used as reinforcement in rubber. The coating of acetylene results in a large amount of dopple bindings in the surface, which are very suitable for reaction with a rubber matrix in the process of vulcanisation.

EXAMPLE 3

The Example relates to silicon wafers. When silicon wafers are exposed to atmospheric air, a silicon dioxide glass layer is formed on the wafer surface.

Binding organic compounds to this silicon dioxide glass is difficult, in particular because a lot of process steps in the known chip technology involve as well high pH as organic solvents.

4" wafers were placed in a 250 liter 3-phase plasma chamber. The pressure in the chamber was lowered to 0.05 mbar and a mixture of argon (20 sccm) and hydrogen (10 sccm) was led to the chamber.

A plasma of 2.5 W/liter was started. After 120 seconds the argon supply was cut of and the hydrogen flow was increased to 25 sccm. After another 120 seconds hexene was led to the chamber with a flow of 50 sccm, immediately after the flow of hydrogen was stopped.

After 30 seconds had passed with hexane flow, the plasma effect was reduced to 1.5 W/liter and the plasma polymerisation continued for another 30 seconds.

The resulting wafers were tested in different environments. The hexane/wafer binding was resistant to NaOH solution at pH 14, acetone/ultrasound and heating up to 90° C.

The invention claimed is:

1. A method of coating at least one surface of an inorganic substrate comprising:
   i) cleaning the surface by subjecting the surface to a first reducing gas plasma consisting essentially of a reducing gas or a reducing gas and an inert gas,
   ii) activating the surface by generating radicals on the surface by subjecting the surface to a second reducing gas plasma and forming a first layer on the surface using a plasma enhanced polymerization process comprising at least one monomer with a sufficiently low molecular weight for the monomer to be in a gaseous state in the gas plasma, wherein said at least one monomer is chosen from $C_1$-$C_{16}$ alkanes, $C_2$-$C_{16}$ alkenes, $C_2$-$C_{16}$ alkynes, styrene, aromatic monomers of styrene compounds, and monomers of vinyl- and acrylate- compounds,
   wherein said inorganic substrate comprises glass, silicon dioxide, ceramics or carbon.

2. The method of claim 1, wherein the first reducing gas plasma and the second reducing gas plasma are the same reducing gas plasma.

3. The method according to claim 1, wherein said at least one monomer is chosen from acetylene, ethane, ethylene, hexane, hexene, 1-hexene, 3-methyl-1-hexene, 1,4-hexadiene, hexyne, 1-hexyne, methylacrylate, styrene and vinylpyrolidone.

4. The method according to claim 1, wherein said at least one monomer has a molecular weight less than or equal to 350.

5. The method according to claim 1, wherein the reducing gas plasma is a reducing gas chosen from $H_2$, $NH_3$, $B_2H_4$, and $F_2$ or a mixture of a reducing gas chosen from $H_2$, $NH_3$, $B_2H_4$, and $F_2$ and an inert gas.

6. The method according to claim 1, wherein the reducing gas plasma is mixture of $H_2$ and argon.

7. The method according to claim 1, wherein the inorganic substrate is further coated with a second layer comprising subjecting the coated surface to a plasma enhanced polymerization process comprising at least one monomer chosen from vinylpyrolidone, acrylonitrile, glycidylmethacrylate, methacrylacid-anhydride, methylbenzaldehyde and other vinyl or acryl containing monomers.

8. The method according claim 1, wherein the step of cleaning and the step of activating is executed sequentially in one chamber.

9. The method according to claim 1, wherein the step of cleaning and the step of activating is executed as a continuous process.

10. The method according to claim 8, wherein the one chamber at any step in the method has an atmosphere that is inert and/or reducing.

11. The method according to claim 1, wherein the method is practiced at a pressure is 0.01 to 1.0 mbar.

12. The method according to claim 11, wherein the method is practiced at pressure 0.04 to 0.4 mbar.

13. The method according to claims 1, wherein the inorganic substrate is exposed to the first and/or second reducing gas plasma for a time ranging from 1 to 3600 seconds.

14. The method according to claim 13, wherein the inorganic substrate is exposed to the first and/or second reducing gas plasma for a time ranging from 10 to 300 seconds.

15. The method according to claim 1, wherein the inorganic substrate is exposed to the plasma enhanced polymerisation process for 1 to 6000 seconds.

16. The method according to claim 15, wherein the inorganic substrate is exposed to the plasma enhanced polymerisation process for 10 to 120 seconds.

17. The method according to claim 1, wherein the step i) comprises generation of radicals by use of gas plasma generated by excitation of a gas in an alternating current (AC), a direct current (DC), low frequency (LF), audio frequency (AF), radio frequency (RF) or microwave generated electric field.

18. The method according to claim 1, wherein the inorganic substrate is glass or glass fibers.

19. The method according to claim 1, wherein the inorganic substrate is silicon dioxide.

20. The method according to claim 1, wherein the inorganic substrate is ceramic or ceramic fibers.

21. The method according to claim 1, wherein the inorganic substrate is carbon or carbon fibers.

22. A coated inorganic substrate obtained by coating at least one surface of the inorganic substrate by a method comprising:
   i) cleaning the surface by subjecting the surface to a first reducing gas plasma consisting essentially of a reducing gas or a reducing gas and an inert gas,
   ii) activating the surface by generating radicals on the surface by subjecting the surface to a second reducing gas plasma and forming a first layer on the surface using a plasma enhanced polymerization process comprising at least one monomer with a sufficiently low molecular weight for the monomer to be in a gaseous state in the gas plasma, wherein said at least one monomer is chosen from $C_1$-$C_{16}$ alkanes, $C_2$-$C_{16}$ alkenes, $C_2$-$C_{16}$ alkynes, styrene, aromatic monomers of styrene compounds, and monomers of vinyl- and acrylate- compounds,
   wherein said inorganic substrate comprises glass, silicon dioxide, ceramics or carbon.

\* \* \* \* \*

UNITED STATES PATENT AND TRADEMARK OFFICE
CERTIFICATE OF CORRECTION

PATENT NO. : 7,238,395 B2  
APPLICATION NO. : 10/275550  
DATED : July 3, 2007  
INVENTOR(S) : Bjørn Winther-Jensen Page 1 of 1

It is certified that error appears in the above-identified patent and that said Letters Patent is hereby corrected as shown below:

On the Title Page, Item (54), in the Title, line 2, "SUBSTRATES" should read -- SUBSTRATE--.

Col. 4, Claim 3, lines 59-60, "vinylpyrolidone" should read --vinylpyrrolidone--.

Col. 5, Claim 6, line 2, "is mixture" should read --is a mixture--.

Col. 5, Claim 7, line 7, "vinylpyrolidone" should read --vinylpyrrolidone--.

Col. 5, Clam 8, line 10, "according claim" should read --according to claim--.

Col. 5, Claim 11, line 20, "pressure is" should read --pressure of--.

Col. 5, Claim 12, line 22, "at pressure 0.04" should read --at a pressure of 0.04--.

Col. 5, Claim 13, line 23, "claims" should read --claim--.

Signed and Sealed this

Sixth Day of November, 2007

JON W. DUDAS  
*Director of the United States Patent and Trademark Office*